United States Patent [19]

Washburn

[11] Patent Number: 5,087,153

[45] Date of Patent: Feb. 11, 1992

[54] INTERNALLY SPIRALED DUCT AND METHOD OF INSTALLATION

[75] Inventor: Robert B. Washburn, Cleveland, Ohio

[73] Assignee: Arnco Corporation, Elyria, Ohio

[21] Appl. No.: 397,740

[22] Filed: Aug. 23, 1989

[51] Int. Cl.⁵ .................................. F32L 51/00
[52] U.S. Cl. ............................ 405/154; 138/108; 405/156; 405/174
[58] Field of Search ............... 405/174, 180, 184, 259, 405/179; 138/108, 121, 122, 105, 173, 177, 178; 254/134.3 FT; 37/142.5

[56] References Cited

U.S. PATENT DOCUMENTS

| | | | |
|---|---|---|---|
| 125,596 | 4/1872 | Mayall | 138/118 |
| D. 202,107 | 11/1965 | Moldt | |
| 267,343 | 11/1882 | Harbison | 138/130 |
| 293,752 | 2/1884 | Krahenbeihl | 138/145 |
| 356,152 | 4/1887 | Munsie | 254/134.3 R |
| 360,782 | 8/1887 | Ober | 138/113 |
| 401,155 | 4/1889 | Gillette | 138/114 |
| 412,095 | 10/1889 | Johnson | 138/108 |
| 527,414 | 4/1894 | Dewees | 174/27 |
| 855,106 | 5/1907 | Hensel | 464/115 |
| 896,984 | 8/1908 | Freeman | 138/103 |
| 1,400,658 | 12/1921 | Brown | 138/108 X |
| 1,588,142 | 6/1926 | Rohrbach | 174/74 R |
| 1,593,367 | 7/1926 | Southworth | 138/177 |
| 1,644,237 | 10/1927 | Christensen | 191/1 R |
| 1,742,353 | 1/1930 | Hunter | 174/99 R |
| 1,743,506 | 1/1930 | Watson | 174/113 R |
| 1,935,999 | 11/1931 | Tessky | 193/38 |
| 1,953,915 | 10/1931 | Burgett | 285/55 |
| 1,959,180 | 5/1934 | Stephens | 219/136 |
| 1,959,194 | 5/1934 | Chapman | 219/136 |
| 2,083,937 | 6/1935 | Begg | 74/502.4 |
| 2,189,207 | 11/1936 | Heath | 138/177 |
| 2,218,444 | 10/1942 | Vineyard | 211/59.2 |
| 2,284,488 | 3/1942 | Johnson | 193/2 R |
| 2,347,912 | 6/1944 | Komives | 29/421.1 |
| 2,375,614 | 5/1945 | Berger | 285/174 |
| 2,382,966 | 8/1945 | Arens | 138/108 X |
| 2,387,729 | 10/1945 | Harvlie | 285/119 |
| 2,412,562 | 12/1946 | Crawshaw | 139/425 R |
| 2,420,221 | 1/1947 | Bell | 138/111 |
| 2,432,641 | 12/1947 | Wilson | 138/177 X |

(List continued on next page.)

FOREIGN PATENT DOCUMENTS

| | | |
|---|---|---|
| 627402 | 3/1930 | Fed. Rep. of Germany . |
| 208259 | 4/1940 | Fed. Rep. of Germany . |
| 2411156 | 9/1975 | Fed. Rep. of Germany . |
| 2515887 | 10/1981 | France . |
| 51-14973 | 2/1976 | Japan . |
| 208259 | 1/1940 | Switzerland . |

OTHER PUBLICATIONS

Bell System Practices, AT&T Co Standard, "Innerduct Placing Underground", Section 628-200-215, Issue 1, Feb. 1981.

Primary Examiner—Dennis L. Taylor
Attorney, Agent, or Firm—Pearne, Gordon, McCoy & Granger

[57] ABSTRACT

A duct for transmission cable including a polymeric tubing having an inner and an outer wall. Spiral ribs having peaks and valleys are located on the inner wall. The valleys are adapted to receive lubrication and the peaks form a surface over which cable may travel at reduced friction. The spiral makes one revolution from about one to six linear feet, at rib heights from about 0.005 to 0.125 inch, and the spacing between the ribs is about 0.025 to 0.500 inch. The duct may be located in an outer duct which is normally buried underground, or directly buried or plowed. There may be a plurality of ducts placed in the ground with an outer duct. Longitudinal ribbing on the external walls prevents rotation. This invention also includes the process of laying a cable which includes pulling the ducts through the outer ducts over the longitudinal ribs and subsequently pulling the cable through the ducts along the spiral ribs, thus reducing the friction and increasing the length of pull that may be done without exceeding the tension strength of the cable.

33 Claims, 3 Drawing Sheets

U.S. PATENT DOCUMENTS

| | | | |
|---|---|---|---|
| 2,624,366 | 1/1953 | Pugh | 138/115 |
| 2,687,997 | 8/1954 | Marchard | 210/321.78 |
| 2,736,897 | 2/1956 | Parsons | 156/148 |
| 2,771,181 | 11/1956 | Montgomery | 138/108 X |
| 2,817,003 | 12/1957 | Dusek | 219/137.31 |
| 2,821,092 | 1/1958 | Cordora | 138/177 X |
| 2,831,737 | 4/1958 | Jacoby | 384/299 |
| 2,871,718 | 2/1959 | Schroeder | 74/502.5 |
| 2,876,334 | 3/1959 | Wojciak | 219/137.42 |
| 2,934,466 | 4/1960 | Molla | 138/128 |
| 3,056,102 | 9/1962 | Cornell | 439/32 |
| 3,093,162 | 6/1963 | Reilling | 138/150 |
| 3,102,740 | 9/1963 | Plummer | 156/266 |
| 3,143,147 | 8/1963 | Sellars | 138/140 |
| 3,161,210 | 12/1964 | Loof | 138/128 |
| 3,202,754 | 3/1964 | Ruch | 174/68.3 |
| 3,212,154 | 10/1965 | Crumpler | 425/380 |
| 3,240,233 | 3/1966 | Johnston | 138/108 |
| 3,363,879 | 1/1968 | Irik | 254/134.3 FT |
| 3,481,156 | 12/1969 | deCsipkes | 464/57 X |
| 3,514,048 | 6/1970 | Lowery | 242/157 R |
| 3,538,210 | 11/1970 | Gatto | 264/519 |
| 3,567,268 | 8/1971 | Peterson | 294/86.4 |
| 3,579,623 | 5/1971 | Thomson | 264/135 |
| 3,711,000 | 1/1973 | Fielder | 226/8 |
| 3,739,459 | 6/1973 | Otani | 228/145 |
| 3,756,244 | 9/1973 | Kinnear | 128/207.14 |
| 3,858,687 | 1/1975 | Masarky et al. | 184/15.1 |
| 3,860,040 | 1/1975 | Sullivan | 138/124 |
| 3,871,048 | 3/1975 | Leigh | 15/159 A |
| 3,875,530 | 12/1975 | Manoukian | 372/65 |
| 3,879,147 | 4/1975 | Morell | 24/115 M |
| 3,903,353 | 9/1975 | Pirooz | 174/68.3 |
| 3,941,157 | 3/1976 | Barnett | 138/115 |
| 3,974,862 | 8/1976 | Fuhrmann | 138/37 |
| 4,016,356 | 4/1977 | McLoughlin | 174/35 R |
| 4,028,902 | 6/1977 | Courson et al. | 405/179 X |
| 4,038,489 | 7/1977 | Stenson | 174/70 R |
| 4,048,807 | 9/1977 | Ellers | 405/159 |
| 4,101,114 | 7/1978 | Martin | 254/134.3 FT |
| 4,111,820 | 9/1978 | Conti | 252/49.5 |
| 4,112,708 | 9/1978 | Fukuda | 464/7 |
| 4,129,356 | 12/1978 | Oestrich | 350/96.23 |
| 4,155,963 | 5/1979 | DeVicchis | 264/1.5 |
| 4,161,966 | 7/1979 | Scheffler | 138/112 |
| 4,163,474 | 1/1979 | MacDonald | 165/179 |
| 4,182,581 | 8/1980 | Uehara | 405/43 |
| 4,197,628 | 3/1980 | Conti | 29/426.5 |
| 4,212,097 | 7/1980 | Portinari | 29/450 |
| 4,220,179 | 9/1980 | Scheffler | 138/113 |
| 4,248,179 | 2/1981 | Bonner | 122/235.14 |
| 4,272,155 | 6/1981 | Slaughter | 350/96.23 |
| 4,286,702 | 9/1981 | Langen | 193/2 R |
| 4,314,648 | 2/1982 | Spamer | 211/59.2 |
| 4,331,322 | 5/1982 | Woodruff | 254/134.3 FT |
| 4,337,922 | 7/1982 | Streiff et al. | 254/134.3 FT |
| 4,337,923 | 7/1982 | Smith | 254/134.3 FT |
| 4,345,363 | 8/1982 | Leuchs | 29/527.4 |
| 4,361,381 | 11/1982 | Williams | 350/96.23 |
| 4,403,686 | 9/1983 | Rycenga | 193/2 C |
| 4,411,409 | 10/1983 | Smith | 354/134.3 FT |
| 4,412,673 | 11/1983 | Ramsden | 254/134.3 FT |
| 4,458,880 | 7/1984 | Conti | 254/134.3 FT |
| 4,496,037 | 1/1985 | Spamer | 193/2 R |
| 4,508,500 | 4/1985 | French | 425/388 |
| 4,565,351 | 1/1986 | Conti | 254/134.3 FT |
| 4,571,450 | 2/1986 | Duffy | 174/68.3 |
| 4,576,207 | 3/1986 | Levine | 138/177 |
| 4,582,093 | 4/1986 | Hubbard et al. | 138/111 |
| 4,606,380 | 8/1986 | Jartoux | 138/122 |
| 4,655,639 | 4/1987 | Reece | 405/179 X |
| 4,661,019 | 4/1987 | McLaughlin | 405/179 X |
| 4,688,890 | 8/1987 | DeMeo et al. | 350/96.23 |
| 4,830,537 | 5/1989 | Munro et al. | 405/179 |

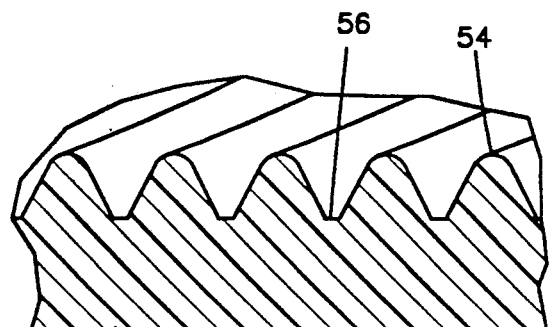
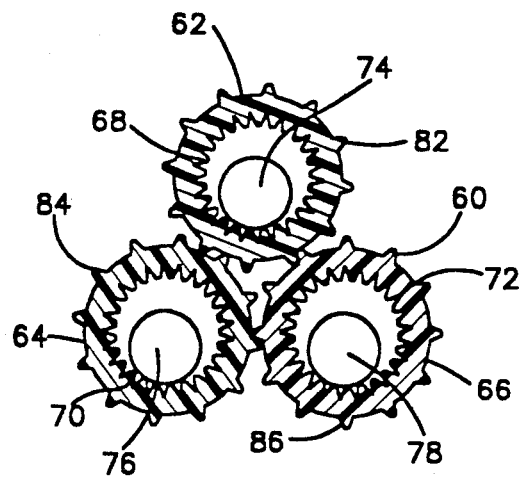
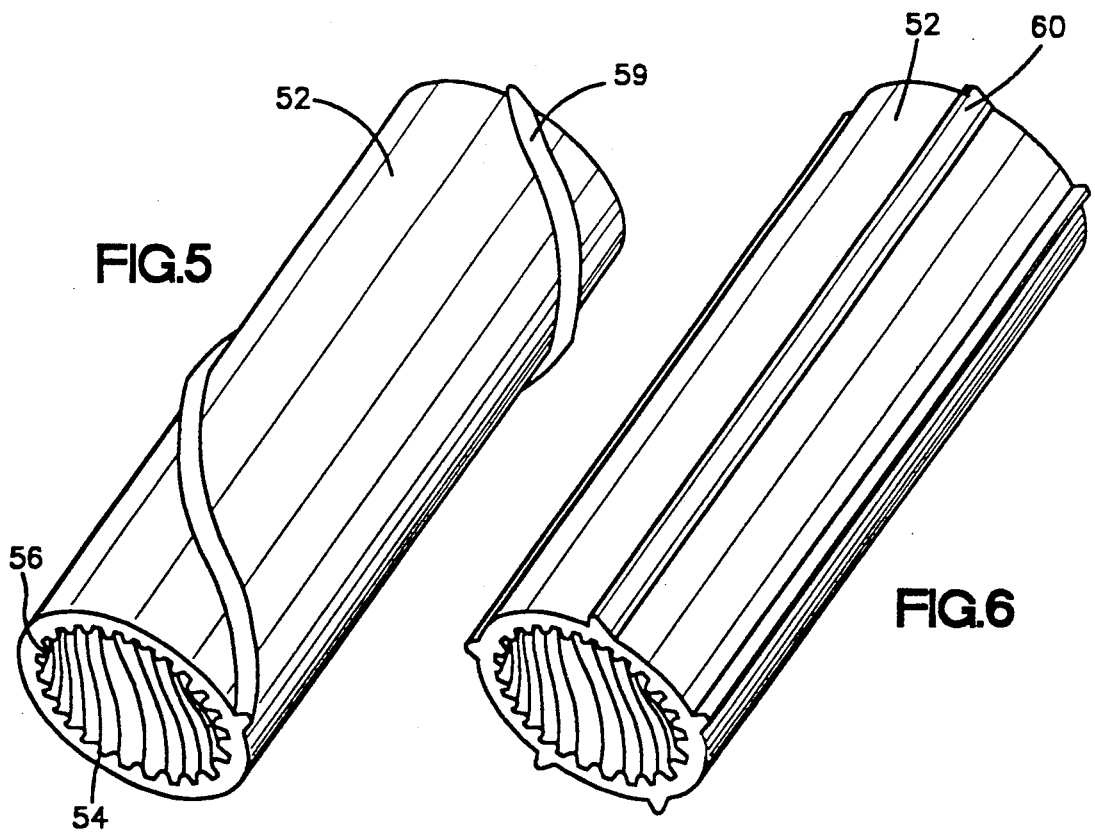

INTERNALLY SPIRALED DUCT AND METHOD OF INSTALLATION

BACKGROUND OF THE INVENTION

When it was discovered that fiber optic cable could be used more efficiently for the transmission of telephone conversations, an enormous replacement undertaking became apparent. The copper cable that was previously used underground had to be replaced by fiber optic cable in a costefficient manner which would maintain the integrity of the transmission cable.

When installing the fiber optic transmission cable, which is usually sheathed in a thermoplastic insulator, there are a number of problems that must be avoided. The plastic sheathing itself must not encounter any sharp surfaces that damage or shave it away to any substantial degree. If this is done, exposure of the light guide occurs, along with the pertinent problems. Moreover, tension cannot exceed a certain safety margin of the transmission cable or it may break.

Because of the forces necessary to pull the transmission cable through a duct, it is highly advantageous to lower the friction between the transmission cable and its duct. When the coefficient of friction of the duct is lowered, the resulting lower forces to pull the cable through the duct allow longer lengths to be strung without a relay.

Previously, transmission cable was pulled through a duct which may have had either no interior ribs or longitudinal interior ribs. An example of the ribbed duct is shown in U.S. Pat. No. 4,565,351, which is hereby incorporated by reference. Alternately, transmission cable was strung through corrugated duct, i.e., transverse ribs. Each of these ducts caused problems. Smooth wall duct had the highest coefficient of friction, and therefore required high forces to be used when pulling a transmission cable therethrough. As a result, relatively short lengths of transmission cable could be placed underground before the forces built up to the point where the cable itself became endangered.

Corrugated and longitudinally ribbed duct reduced surface friction with the cable. Both the longitudinally ribbed and smooth wall ducts, however, had a tendency to damage the cable jacket. Such damage to the jacket would not normally be discovered until a later date, and replacement of the cable would be necessary. The replacement process was highly undesirable and needlessly expensive.

Corrugated tubing had a relatively low coefficient of friction relative to the transmission cable, and did not have a tendency to damage the sheathing. However, corrugated duct is relatively thin and has uneven walls because of the necessity of continuously blow-molding it during its manufacturing process. Moreover, the thin walled corrugations had a tendency to stretch or break during field installation because of their own relatively low tensile strength. The flexible nature of corrugated tubing also allowed it to rotate and shear. The thin wall thickness also wore quickly and perforated when transmission cable was pulled through it. The depth of the corrugations is generally two to four times as deep as longitudinal ribs, thus causing the lubricant to well up between successive corrugations and impeding normal cable lubrication efforts.

This invention uses a duct including a polymeric tubing having an inner and outer wall. The inner wall has spiral ribs. The use of spiral ribs has been found to give the best combination of results when used with a transmission cable for reducing the friction between the cable and the duct, providing structural integrity of the tubing, and not damaging the sheath on the cable. The spiral ribs act much like corrugations in that they do not shave off the sheathing because the cable tends to pass over them in a transverse manner. The internally spiraled duct is much stronger than corrugated tubing and does not have a tendency to rip or tear during its installation. It is also flexible enough to go around corners. The valleys between the spiral ribs also act as a reservoir for lubricant which is commonly used to reduce friction between the cable and the duct.

SUMMARY OF THE INVENTION

A duct for transmission cable and other includes a polymeric tubing having an inner wall and an outer wall. Spiral ribs having peaks and valleys are located along the inner wall, and the valleys are adapted to receive lubrication. The peaks form a surface over which the cable may travel at reduced friction.

BRIEF DESCRIPTION OF THE DRAWINGS

FIG. 4 is an expanded view of the internal spiral ribs of the duct.

FIG. 5 illustrates one embodiment of the exterior ribs of the duct.

FIG. 6 illustrates an alternate embodiment of exterior ribs on the duct.

FIG. 7 illustrates a plurality of ducts and transmission cable.

DETAILED DESCRIPTION OF THE DRAWINGS

Figure 1:
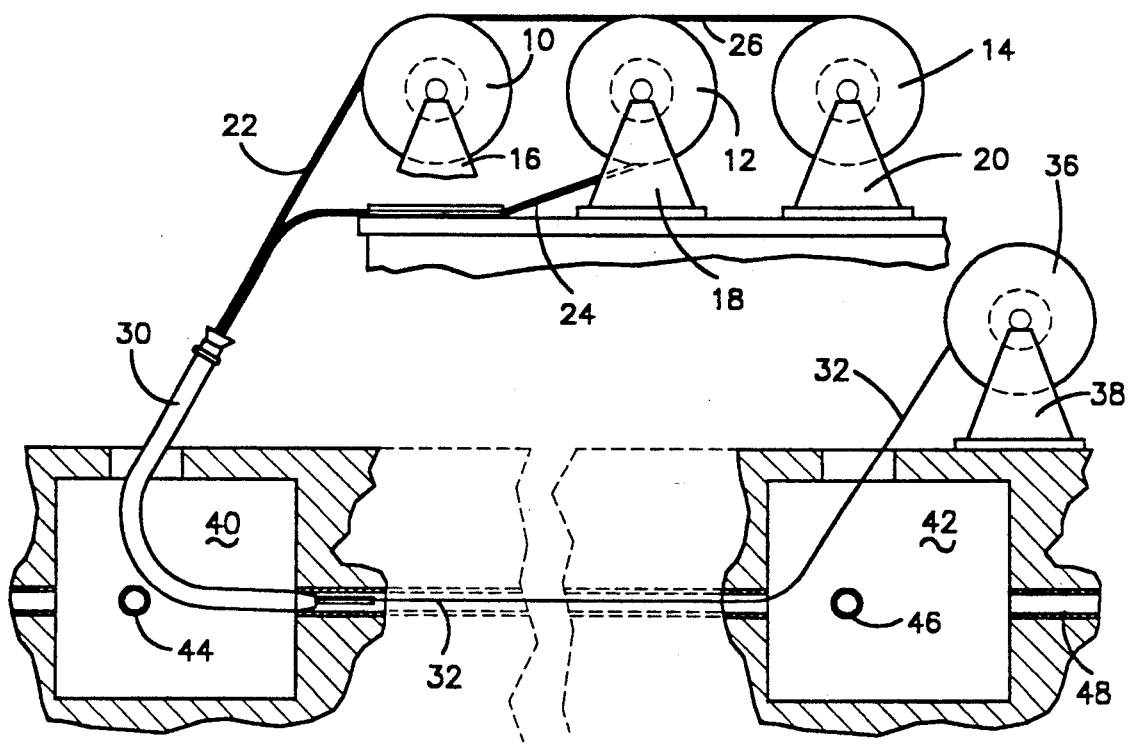
FIG. 1 is a schematic representation of the installation of multiple ducts which are surrounded by an outer duct.

As particularly illustrated in FIG. 1, a plurality of takeoff reels 10, 12, and 14 on stands 16, 18, and 20, respectively, are located so that they feed a plurality of ducts 22, 24, and 26 into a feeder tube 30. The feeder tube 30, as well as the apparatus for pulling the ducts through an outer duct 32, is disclosed in applicant's U.S. Pat. Nos. 4,296,157; 4,028,473; and 4,326,605, which are hereby incorporated by reference. As disclosed therein, lubricant is also commonly used and fed into the feeder tube with the transmission cable.

The ducts 22, 24, and 26 are pulled by means of a pull line 32 toward a takeup reel 36 mounted on a stand 38. The takeup strand 32 is suitably attached to the duct, as disclosed in the above-noted U.S. Pat. No. 4,028,473. The pull line 32 is wound on the reel 36, followed by the duct. As a result of this invention, the distance from the work area 40 to the work area 42 has been substantially increased for the length of the transmission cable that may be pulled through the duct. At the present time, this distance may be 3000 to 6000 feet with the use of this invention.

Normally, the duct transmission or other cable goes into a work area such as 40 by means of an outer duct 44 and may be passed back into another outer duct, such as 46 or 48, to relay them to another location.

Figure 2:
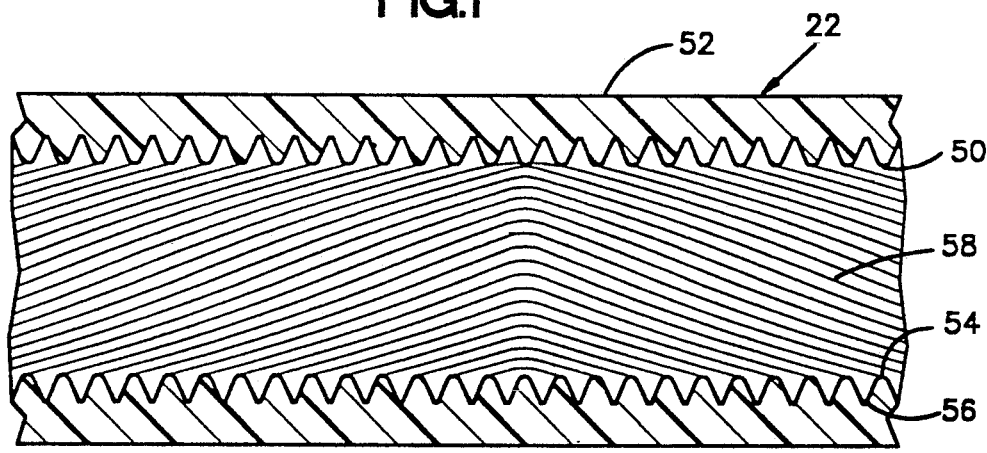
FIG. 2 is a longitudinal cross section of the duct of this invention.
Figure 3:
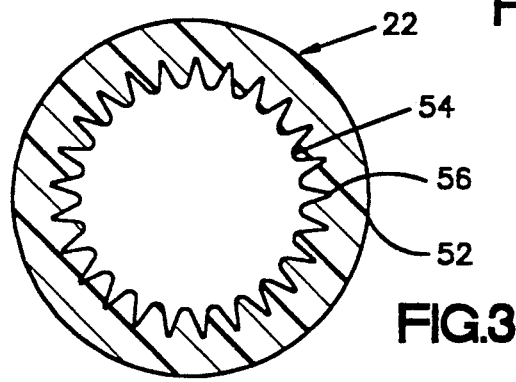
FIG. 3 is a transverse cross section of the duct of this invention.

As particularly illustrated in FIGS. 2, 3, and 4, the duct 22 includes an inner wall 50 and an outer wall 52. The inner wall 50 includes peaks 54 and valleys 56 forming spiral ribs 58 along the interior of the tubing. As used herein, the term "spiral" is meant to define ribs which extend in the transverse and longitudinal direction relative to the duct 22. The term spiral is not limited to a helix or a single frequency, direction, angle, spacing, size, or ribs which are continuous. The tops of the peaks form the only surface that contacts a cable passing through the duct, such tops being a small area relative to the area of the valley. The material which comprises the duct is normally a thermoplastic, such as polyethylene, although other materials are well known in the art. The lubricant used with the transmission cable is that such as disclosed in applicant's U.S. Pat. No. 4,111,820, the disclosure of which is hereby incorporated by reference.

The use of spiral ribs has been found to reduce dramatically the coefficient of friction without noticeably damaging the cable sheaths or jackets. The coefficient of friction (f) of the transmission cable as it passes over the spiral ribs can be measured over various load and velocity conditions by pulling cable through a duct coiled about a fixed drum. The following mathematical relationship can be used to calculate values of f from cable tension measurements leading into and out of a duct loop: $f = (1/(2\pi n))$ ln (Tension out/Tension in) where (n) is the number of complete duct wraps about the fixed drum, ($\pi$) is a constant equal to 3.1416 and (ln) is the natural logarithm.

We have also found that velocity has an effect on the measured values such that either load or velocity must remain constant to compare test data. In our testing, we have found that the relationship between f and velocity varied in a predictable way which could be mathematically expressed as $K = f/\ln \bar{v}$, where (K) is known as the velocity-compensated frictional load factor and ($\bar{v}$) the average velocity. By comparing values of K, a more accurate picture is expressed relating friction, load and pulling velocity. For any constant incoming load, both f and K can be calculated. In actual tests, the following load factors K were found for unlubricated duct:

| Incoming Load on Loop | Load Factors (K) | | | | |
|---|---|---|---|---|---|
| | 10.6 # | 20.0 # | 25.0 # | 35.6 # | 40.0 # |
| No spiral longi-tudinally | 0.1008 ±.0111 | 0.0916 — | fused | can't pull | can't pull |
| 1 revolution/ 6 ft. | 0.0925 ±.0072 | 0.0838 ±.0128 | 0.0764 ±.0055 | 0.0896 ±.0362 | fused |
| 1 revolution/ 3 ft. | 0.0936 ±.0089 | 0.0787 ±.0065 | 0.040 ±.004 | 0.0740 ±.0073 | |
| 1 revolution/ 2 ft. | 0.0896 ±.0036 | 0.0813 ±.0068 | 0.0822 ±.0067 | 0.0754 ±.0062 | 0.0717 |
| 1 revolution/ 1 ft. | 0.0905 ±.0083 | 0.0772 ±.0051 | 0.0752 ±.0027 | 0.0756 ±.0070 | |

It is important to note that even at relatively low degrees of spiraling, such as one revolution per six feet, the velocity-compensated load factor (coefficient of friction) is substantially reduced to 0.0764 at the 25 pound incoming load, whereas its non-spiraled counterpart fused the cable to the duct wall. In addition, it should be noted that the coefficient of friction is minimized, at between one and three revolutions per foot.

The testing showed other important ramifications. Regardless of how sharp the spiral ribs were pointed, no jacket cutting or abrasion to the cable was observed. This is a significant improvement over both smooth wall and longitudinally ribbed duct. In those cases, resulting damage from shearing, cutting, and fusion to the cable commonly occurred. The spiral ribbed duct did not itself incur any damage such as that commonly found in corrugated tubing. Moreover, although the ribbing is spiral, there was no tendency to twist the transmission cable.

Because lubricants are commonly used during transmission cable placement, it is desirable to keep the frequency of spirals as low as possible in order to have the lubricant pass efficiently along the cable. Lack of passage of the lubricant is another drawback of corrugated duct, since the lubricant tends to be wiped off with the initial corrugations. With a low frequency spiral, however, lubricant is free to move along the duct, again gaining the benefit of low friction corrugations with ease of lubrication. With lubrication manufactured by Arnco Corp., Model No. SF150DF, load factors as low as 0.0050 have been measured for cable traveling at 100 ft./min. with an incoming load of 200 pounds.

The duct diameter is not critical, although typically ducts range from one inch to six inches inside diameter. Wall thicknesses may also vary, but common to this invention are sizes such as Standard Thermoplastic Pipe Dimension Ratio (SIDR) 5 through 21. Rib height commonly varies from about 0.005 inch to 0.150 inch, with the preferred being about 0.015 inch. The rib spacing typically varies between from about 0.025 inch and 0.500 inch, with the preferred spacing being 0.125 inch. The frequency of spirals can range between 10 revolutions per foot and 0.05 revolution per foot, the preferred being about 0.33 revolution per foot, or one revolution every three feet. The direction of spiral rotation can be altered in a periodic fashion to create a sinusoidal wave, as well, without diminishing the improved effect.

The outer diameter wall of the duct may be smooth, as noted in FIGS. 2 through 4, or, alternately, as illustrated in FIGS. 5 and 6, may be ribbed along the length thereof. A spiral rib 59 may be used along the outer wall 52. The spiral nature of the rib will add additional strength, and also will cause a type of interlocking with other tubing if they are placed together as illustrated in FIG. 7. Alternatively, longitudinal ribs 60, as shown in FIG. 6, may be used along the outer wall 52 to aid in inserting the duct through an outer duct. The use of the ribbing reduces friction in this regard, as does the internal spiral ribbing 58. The spiral ribbing 58 may be continuous as shown in FIG. 5, or it may alternate direction, as shown in FIG. 2. The benefit of alternating direction of the spiral rib 58 is that a cable passed through the duct will not have a tendency to rotate with the spiral. By reducing the area of the duct that touches the outer duct, the friction, and therefore the force needed to pull the duct through the outer duct, is substantially reduced.

As illustrated in FIG. 7, a series of ducts 62, 64, and 66 having inner walls with spiral ribs 68, 70, and 72, respectively, are used to hold transmission cables 74, 76, and 78. Exterior ribs 82, 84, and 86 interlock with each other, whether spiral or longitudinal, in order to prevent rotation of one duct relative to the other. Typically, there are four to five ribs per linear inch around the duct of this invention. The three conduits shown in FIG. 7 may be connected along their length in the molding process or, alternately, may be molded separately and placed in the ground separately.

As noted in FIG. 7, the tops of the peaks of the duct form an opening substantially larger than the cable which passes through it. The opening is large enough so that the cable passing through it cannot touch the tops of the peaks at two points 180° apart at a given distance along the length of the duct. If the cable touched the tops of the peaks around the circumference of the inner wall, the friction would be so great upon the cable that it would require substantially larger forces to convey it through the duct.

Figure 8:
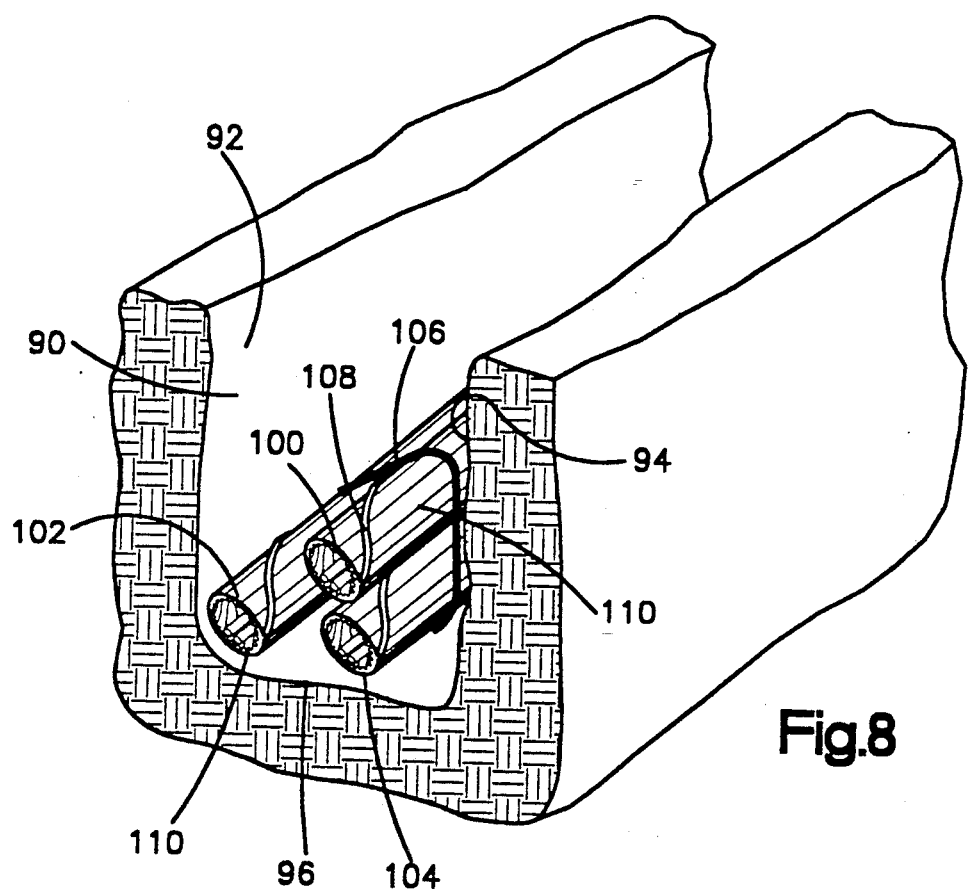
FIG. 8 is a schematic representation of the installation of duct in an open trench application.

FIG. 8 illustrates an open trench 90 having side walls 92, 94 and a bottom 96. Ducts 100, 102, and 104 are laid in the trench 90 in a generally triangular fashion and bound together by a band 106. The ducts have spiral ribs 108 on the outer wall 110. Similarly, there are spiral ribs on the inner wall of the duct. The ribs 108 may also be longitudinal so that they interlock and do not rotate relative to one another. After the ducts have been laid, they are covered with soil.

Figure 9:
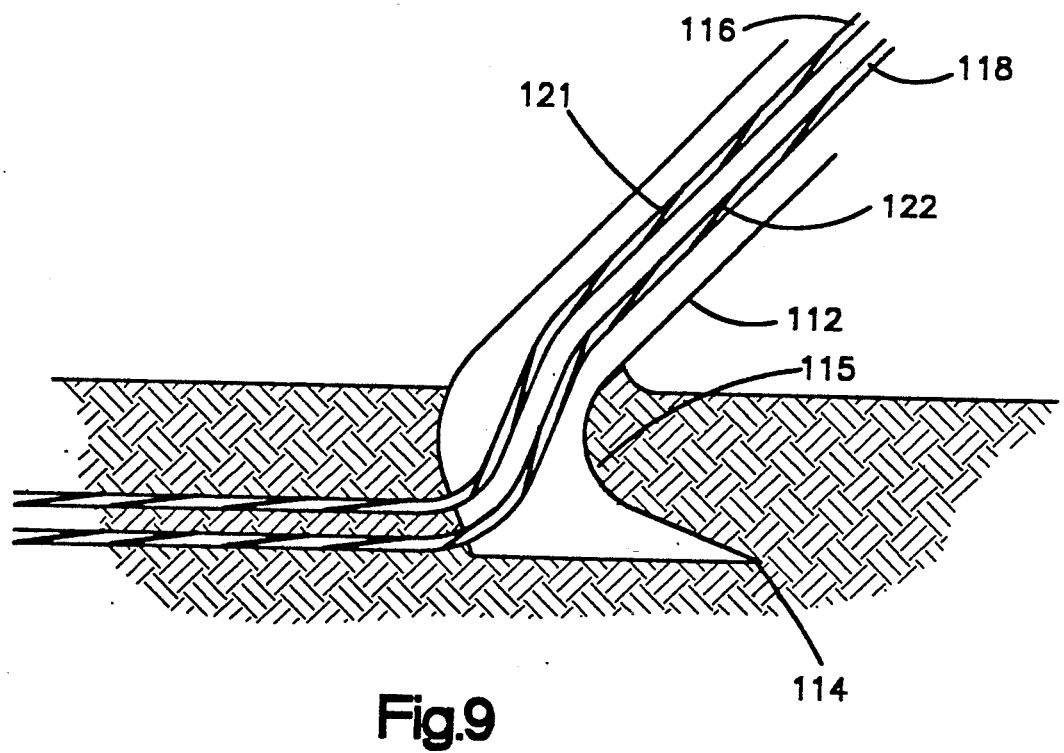
FIG. 9 is a schematic representation of the installation of duct in a direct plow application.

Another method of laying the ducts is known as "direct plow." By this method, a plow 112 is attached to a large tractor (not shown). As the plow moves forward, or from left to right as shown in FIG. 9, the point 114 disrupts the earth and loosens it so that the ducts 116 and 118 having spiral ribs 120, 122 can pass through the hollow inner section, out of the back of the plow and into the ground. In this embodiment, it is not necessary to cover the ducts in a subsequent step. Accordingly, this process is relatively fast. As previously discussed, the optical cables are then passed through the ducts after they have been laid in place.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A duct for longitudinal transmission of fiber optic and other cable comprising:
    a polymeric tubing having an inner wall and an outer wall;
    spiral ribs having peaks with tops and valleys between the peaks along the inner wall, the valleys adapted to receive lubrication, the tops of the peaks forming substantially the only surface that contacts the cable as it passes longitudinally therethrough, the tops of the peaks forming an opening large enough so that the cable passing through it cannot touch the tops of the peaks at two points 180° apart at a given distance along the length of the duct, the tops of the peaks having low friction and a small surface area relative to the surface area of the valleys over which the cable may travel longitudinally at reduced friction and with reduced damage to the cable, whereby the cable is able to be pulled through the duct in long expanses without damage.

2. The duct of claim 1, wherein each rib makes about one revolution for about one to six linear feet.

3. The duct of claim 2, wherein each rib makes one revolution for about one to three linear feet and rotates in one direction.

4. The duct of claim 1, wherein the spiral ribs alternate direction.

5. The duct of claim 1, wherein a velocity-compensated coefficient of friction K, where $K = f/\ln v$, f being the coefficient of friction and $\ln v$ being the natural logarithm of the velocity, is about 0.02 to 0.0936.

6. The duct of claim 2, wherein there is lubricant between the spiral ribs.

7. The duct of claim 2, wherein the tubing has an inside diameter from ½ inch to 6 inches and a wall thickness from SIDR 5 through 21.

8. The duct of claim 2, wherein the rib height is from about 0.005 to 0.125 inch.

9. The duct of claim 8, wherein the rib height is about 0.015 inch.

10. The duct of claim 2, wherein the rib spacing is from about 0.025 to 0.500 inch.

11. The duct of claim 10, wherein the rib spacing is about 0.125 inch.

12. The duct of claim 2, wherein the rib height is from 0.005 to 0.125 inch and the rib spacing is from 0.025 to 0.500 inch.

13. The duct of claim 2, wherein there is a second polymeric tubing along the length of the first duct, the second polymeric tubing having a second inner wall and a second outer wall and having second spiral ribs along the second inner wall.

14. The duct of claim 2, wherein the outer wall has spiral ribs.

15. The duct of claim 2, wherein the outer wall has longitudinal ribs.

16. The duct of claim 13, wherein the outer wall of polymeric tubing and the second outer wall of the second polymeric tubing have longitudinal ribs which interlock when the polymeric tubing and the second polymeric tubing are held side by side.

17. The duct of claim 16, wherein there are about one to six longitudinal ribs per linear inch.

18. A duct system comprising:
    an outer duct under the surface of the ground and extending between two points;
    a plurality of ducts in the outer duct, each of the ducts including polymeric tubing having inner walls and outer walls and spiral ribs along the inner walls, the spiral ribs having peaks with tops and valley between the ribs, the tops of the peaks forming substantially the only surface that contacts a cable as it passes longitudinally therethrough, the tops of the peaks forming an opening large enough so that the cable passing through it cannot touch the tops of the peaks 180° apart at a given distance along the length of the duct, the tops of the peaks having low friction and a small surface area relative to the surface area of the valley over which the cable may pass longitudinally at reduced friction and with reduced damage to the cable.

19. The duct system of claim 18, wherein each rib makes about one revolution for about one to six linear feet in one direction and then in the other direction in an alternating fashion.

20. The duct system of claim 19, wherein the rib spacing is from about 0.025 to 0.500 inch.

21. The duct system of claim 20, wherein rib height is from about 0.005 to 0.125 inch.

22. The duct system of claim 21, wherein the ducts have longitudinal ribs along their length which interlock when the ducts are held in place beside each other in order to reduce twisting of the ducts.

23. A method for installing a cable in a duct having an inner wall and an outer wall and installing the duct in an outer duct, comprising:
attaching one end of a pull line to the duct, sending the other end of the pull line through the outer duct, pulling the duct through the outer duct, the duct including a polymeric tubing;
ribs on the outer walls of the duct that reduce the amount of friction and therefore the force required to pull the duct through the outer duct;
spiral ribs having valleys and peaks with tops on the inner wall of the duct, the tops of the peaks forming substantially the only surface that contacts the cable as it passes longitudinally therethrough, the tops of the peaks forming an opening large enough so that the cable passing through it cannot touch the tops of the peaks at two points 180° at a given distance along the length of the duct, the tops of the peaks having low friction and a small surface area relative to the surface area of the valleys;
pulling a cable longitudinally over the tops of the peaks of the spiral ribs in the duct, thereby reducing the force necessary to install the cable and increasing the length of cable that can be pulled through the duct without damaging or breaking it.

24. The method for installing a cable of claim 23, wherein the cable is pulled over said spiral ribs which make one revolution for about one to three linear feet in one direction and then in the other direction in an alternating fashion and are spaced apart from about 0.025 to 0.500 inch.

25. The method for installing a cable of claim 24, wherein the cable is pulled over said ribs, which have a rib height from about 0.005 to 0.125 inch.

26. The method for installing a cable of claim 25, wherein a second polymeric tubing having a second inner wall and second outer wall is pulled through the outer duct with the polymeric tubing, the outer wall and the second outer wall having ribs along their length which cause an interlocking when the polymeric tubing and second polymeric tubing are held together.

27. The method of installing a cable of claim 26, wherein the ribs along the outer wall and second outer wall are longitudinal and abut against one another and substantially reduce rotation of one tubing around the other.

28. The method of installing a cable of claim 24, wherein a second polymeric tubing having a second inner wall and a second outer wall is attached along the length of its outer wall to the outer wall of the polymeric tubing, the second polymeric tubing having spiral ribs along its second inner wall.

29. A method for installing a cable in a duct, comprising:
opening a trench in the soil having side walls and a bottom;
laying a duct having an inner wall and an outer wall in the duct, the inner wall of the duct having spiral ribs with valleys and peaks with tops, the tops of the peaks forming a surface with low friction and having a small surface area relative to the entire surface area of the inner wall; and
passing the cable over the peaks of the spiral ribs in the duct, thereby reducing the force necessary to install the cable and increasing the length of cable that can be pulled through the duct without damaging or breaking it due to the low friction of the tops of the peaks over which the cable passes.

30. The method of installing a cable of claim 29 which further includes the method of passing a pull line through the duct, attaching one end of the pull line to the cable and pulling the cable through the duct with the pull line.

31. The method of installing a cable in a duct having an inner wall and an outer wall, comprising:
pulling a plow through the soil;
disrupting the soil and loosening it with the plow;
passing a duct through an opening from the top to the bottom rear area of the plow;
placing the duct in the soil, the duct having an inner wall and an outer wall in the duct, the inner wall of the duct having spiral ribs with valleys and peaks with tops, the tops of the peaks forming substantially the only surface that contacts the cable as it passes longitudinally therethrough, the tops of the peaks forming an opening large enough so that the cable passing through it cannot touch the tops of the peaks at two points 180° apart at a given distance along the length of the duct, the tops of the peaks having low friction and a small surface area relative to the surface area of the valley;
pulling a cable longitudinally through the duct over the tops of the peaks of spiral ribs along the inner wall of the duct, thereby reducing the force necessary to install the cable and increase the length of cable that can be pulled through the duct without damaging or breaking it.

32. The method of claim 31, which further includes passing the cable over the spiral ribs which make one revolution for about one to three linear feet and are spaced apart from about 0.025 to 0.500 inch.

33. The method of claim 32, which further includes passing a pull line through the duct attaching one end of the pull line to the cable and pulling the cable through the duct.

* * * * *

UNITED STATES PATENT AND TRADEMARK OFFICE
CERTIFICATE OF CORRECTION

PATENT NO. : 5,087,153
DATED : February 11, 1992
INVENTOR(S) : Robert B. Washburn It is certified that error appears in the above-identified patent and that said Letters Patent is hereby corrected as shown below:

Column 1, Claim 3, line 49, after the first occurence of "one"
please insert --revolution for about one--.

Signed and Sealed this

Twenty-eighth Day of June, 1994

Attest:

BRUCE LEHMAN

Attesting Officer    Commissioner of Patents and Trademarks

REEXAMINATION CERTIFICATE (2196th)
United States Patent [19]
Washburn

[11] B1 5,087,153
[45] Certificate Issued Jan. 18, 1994

[54] INTERNALLY SPIRALED DUCT AND METHOD OF INSTALLATION

[75] Inventor: Robert B. Washburn, Cleveland, Ohio

[73] Assignee: Arnco Corporation, Elyria, Ohio

Reexamination Request:
No. 90/002,811, Aug. 7, 1992

Reexamination Certificate for:
Patent No.: 5,087,153
Issued: Feb. 11, 1992
Appl. No.: 397,740
Filed: Aug. 23, 1989

[51] Int. Cl.$^5$ ................................ F16L 1/00
[52] U.S. Cl. .................... 405/154; 138/108; 174/68.3; 405/156; 405/174
[58] Field of Search ............ 405/154, 156, 174, 180, 405/184, 179; 254/134.3 FT; 138/108, 121, 122, 105, 173, 177, 178; 174/68.3

[56] References Cited
U.S. PATENT DOCUMENTS
4,896,997  1/1990  Gaylin ........................ 405/174 X

FOREIGN PATENT DOCUMENTS
1415474  1/1969  Fed. Rep. of Germany.
3217401  11/1983 Fed. Rep. of Germany.
3529541  2/1987  Fed. Rep. of Germany.
8901210  4/1989  Fed. Rep. of Germany.

*Primary Examiner*—Dennis L. Taylor

[57] ABSTRACT

A duct for transmission cable including a polymeric tubing having an inner and an outer wall. Spiral ribs having peaks and valleys are located on the inner wall. The valleys are adapted to receive lubrication and the peaks form a surface over which cable may travel at reduced friction. The spiral makes one revolution from about one to six linear feet, at rib heights from about 0.005 to 0.125 inch, and the spacing between the ribs is about 0.025 to 0.500 inch. The duct may be located in an outer duct which is normally buried underground, or directly buried or plowed. There may be a plurality of ducts placed in the ground with an outer duct. Longitudinal ribbing on the external walls prevents rotation. This invention also includes the process of laying a cable which includes pulling the ducts through the outer ducts over the longitudinal ribs and subsequently pulling the cable through the ducts along the spiral ribs, thus reducing the friction and increasing the length of pull that may be done without exceeding the tension strength of the cable.

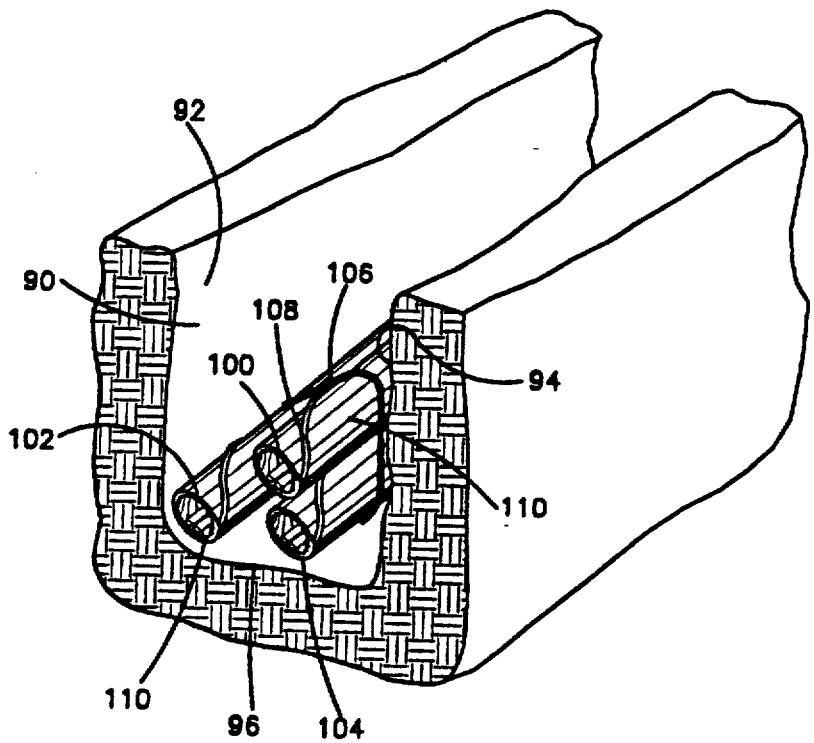

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 4 is cancelled.

Claims 1-3, 18, 19, 23, 24, 29, 31 and 32 are determined to be patentable as amended.

Claims 5-17, 20-22, 25-28, 30 and 33, dependent on an amended claim, are determined to be patentable.

1. A duct for longitudinal transmission of fiber optic and other cable comprising:
   a polymeric tubing having an inner wall and an outer wall; spiral ribs having peaks with tops and valleys between the peaks along the inner wall, the valleys adapted to receive lubrication, the tops of the peaks forming substantially the only surface that contacts the cable as it passes longitudinally therethrough, the tops of the peaks forming an opening large enough so that the cable passing through it cannot touch the tops of the peaks at two points 180° apart at a given distance along the length of the duct, the tops of the peaks having low friction and a small surface area relative to the surface area of the valleys over which the cable may travel longitudinally at reduced friction and with reduced damage to the cable, whereby the cable is able to be pulled through the duct in long expanses without damage, *including spiral ribs rotating in one direction and then in another direction in an alternating fashion.*

2. The duct of claim 1, wherein each [rib makes] *rib's frequency is* about one revolution for about one to six linear feet.

3. The duct of claim 2, therein each [rib makes] *rib's frequency is* one to three linear feet and rotates in one direction.

18. A duct system comprising:
   an outer duct under the surface of the ground and extending between two points;
   a plurality of ducts in the outer duct, each of the ducts including polymeric tubing having inner walls and outer walls and spiral ribs along the inner walls, the spiral ribs having peaks with tops and valley between the ribs, the tops of the peaks forming substantially the only surface that contacts a cable as it passes longitudinally therethrough, the tops of the peaks forming an opening large enough so that the cable passing through it cannot touch the tops of the peaks 180° apart at a given distance along the length of the duct, the tops of the peaks having low friction and a small surface area relative to the surface area of the valley over which the cable may pass longitudinally at reduced friction and with reduced damage to the cable, *including spiral ribs rotating in one direction and then in another direction in an alternating fashion.*

19. The duct system of claim 18, wherein each [rib makes] *rib's frequency is* about one revolution for about one to six linear feet in one direction and then in the other direction in an alternating fashion.

23. A method for installing a cable in a duct having an inner wall and an outer wall and installing the duct in an outer duct, comprising;
   attaching one end of a pull line to the duct, sending the other end of the pull line through the outer duct, pulling the duct through the outer duct, the duct including a polymeric tubing;
   ribs on the outer walls of the duct that reduce the amount of friction and therefore the force required to pull the duct through the outer duct;
   spiral ribs having valleys and peaks with tops on the inner wall of the duct, the tops of the peaks forming substantially the only surface that contacts the cable as it passes longitudinally therethrough, the tops of the peaks forming an opening large enough so that the cable passing through it cannot touch the tops of the peaks at two points 180° at a given distance along the length of the duct, the tops of the peaks having low friction and a small surface area relative to the surface area of the valleys, *including spiral ribs rotating in one direction and then in another direction in an alternating fashion;*
   pulling a cable longitudinally over the tops of the peaks of the spiral ribs in the duct, thereby reducing the force necessary to install the cable and increasing the length of cable that can be pulled through the duct without damaging or breaking it.

24. The method for installing a cable of claim 23, wherein the cable is pulled over said spiral ribs which [make] *have a frequency of* one revolution for about one to three linear feet in one direction and then in the other direction in an alternating fashion and are spaced apart from about 0.025 to 0.500 inch.

29. A method for installing a cable in a duct, comprising:
   opening a trench in the soil having side walls and a bottom;
   laying a duct having an inner wall and an outer wall in the trench, the inner wall of the duct having spiral ribs with valleys and peaks with tops, the tops of the peaks forming a surface with low friction and having a small surface area relative to the entire surface area of the inner wall, *including spiral ribs rotating in one direction and then in another direction in an alternating fashion;* and
   passing the cable over the peaks of the spiral ribs in the duct, thereby reducing the force necessary to install the cable and increasing the length of cable that can be pulled through the duct without damaging or breaking it due to the low friction of the tops of the peaks over which the cable passes.

31. The method of installing a cable in a duct having an inner wall and an outer wall, comprising:
   pulling a plow through the soil;
   disrupting the soil and loosening it with the plow;
   passing a duct through an opening from the top to the bottom rear area of the plow;
   placing the duct in the soil, the duct having an inner wall and an outer wall in the duct, the inner wall of the duct having spiral ribs with valleys and peaks with tops, the tops of the peaks forming substantially the only surface that contacts the cable as it passes longitudinally therethrough, the tops of the peaks forming an opening large enough so that the cable passing through it cannot touch the tops of the peaks at two points 180° apart at a given distance along the length of the duct, the tops of the peaks having low friction and a small surface area relative to the surface area of the valley, *including spiral ribs rotating in one direction and then in another direction in an alternating fashion;* pulling a cable longitudinally through the duct over the tops of the peaks of spiral ribs along the inner wall of the duct, thereby reducing the force necessary to install the cable and increase the length of cable that can be pulled through the duct without damaging or breaking it.

32. The method of claim 31, which further includes passing the cable over the spiral ribs which [make] *have a frequency of* one revolution for about one to three linear feet and are spaced apart from about 0.025 to 0.500 inch.

* * * * *